(12) United States Patent
Biro (10) Patent No.: US 10,654,575 B1
(45) Date of Patent: May 19, 2020

(54) OFF WING SLIDE RAMP

(71) Applicant: Air Cruisers Company, LLC, Wall Township, NJ (US)

(72) Inventor: Robert J. Biro, Brick, NJ (US)

(73) Assignee: Air Cruisers Company, LLC, Wall Township, NJ (US)

( * ) Notice: Subject to any disclaimer, the term of this patent is extended or adjusted under 35 U.S.C. 154(b) by 325 days.

(21) Appl. No.: 15/591,346

(22) Filed: May 10, 2017

Related U.S. Application Data

(60) Provisional application No. 62/333,926, filed on May 10, 2016.

(51) Int. Cl.
*B64D 25/14* (2006.01)
(52) U.S. Cl.
CPC .................... *B64D 25/14* (2013.01)
(58) Field of Classification Search
CPC ................... B64D 25/14; A62B 1/20
USPC .............. 244/137.1, 137.2, 905; 193/25 B; 182/48
See application file for complete search history.

(56) References Cited

U.S. PATENT DOCUMENTS

| 3,476,338 | A | | 11/1969 | Fisher | |
|---|---|---|---|---|---|
| 3,973,645 | A | * | 8/1976 | Dix | B64D 25/14 182/48 |
| 4,333,546 | A | * | 6/1982 | Fisher | B64D 25/14 182/48 |
| 4,684,079 | A | * | 8/1987 | Miller | B64D 25/14 193/25 B |
| 4,846,422 | A | * | 7/1989 | Fisher | B64D 25/14 244/137.2 |
| 8,952,828 | B2 | * | 2/2015 | Kohlmeier-Beckmann | A62B 3/00 340/425.5 |
| 10,189,573 | B2 | * | 1/2019 | Haynes | B64D 25/14 |

* cited by examiner

*Primary Examiner* — William R Harp
(74) *Attorney, Agent, or Firm* — Kilpatrick Townsend & Stockton LLP; Kristin M. Crall (57) ABSTRACT

Embodiments of the present disclosure relate generally to slide ramps designed for use with an aircraft exit door positioned near or over a wing of the aircraft. The embodiments provide a plurality of tubular structures comprising differing diameters and tapering lengths. The tubular structures form a ramp that transitions aircraft evacuees from the wing to the evacuation slide. The resulting ramp helps provide an even exit surface along a sloped/angled wing, and with respect to the angled wing/fuselage connection.

11 Claims, 9 Drawing Sheets

OFF WING SLIDE RAMP

CROSS REFERENCE TO RELATED APPLICATIONS

This application claims the benefit of U.S. Provisional Application Ser. No. 62/333,926, filed May 10, 2016, titled "Simplified Low Weight Off Wing Slide Ramp," the entire contents of which are hereby incorporated by reference.

FIELD OF THE DISCLOSURE

Embodiments of the present disclosure relate generally to slide ramps designed for use with an aircraft exit door positioned near or over a wing of the aircraft. The embodiments provide a plurality of tubular structures comprising differing diameters and tapering lengths. The tubular structures form a ramp that leads aircraft evacuees from the wing to the evacuation slide. The resulting ramp helps provide a level and even exit surface along a sloped/angled wing, and with respect to the angled wing/fuselage connection.

BACKGROUND

The requirements for evacuating aircraft passengers quickly and safely from an aircraft emergency situation have become increasingly important as the size of aircraft and the number of passengers increases. Current federal regulations require evacuation of the aircraft in mere seconds. Emergency exit doors are provided along the aircraft fuselage in order to allow passengers to quickly evacuate the aircraft in an emergency situation. However, a number of passenger seats are located directly over the wing section of an aircraft. It is thus desirable to locate an emergency exit hatch immediately over the aircraft wing so that the passengers can leave the aircraft by stepping out onto the wing. Some evacuation slides are thus configured to be deployed directly over the aircraft wing. However, when an exit door is positioned over a wing of the aircraft, it is necessary to provide a safe way for passengers to travel from the wing surface to the evacuation slide configured to deploy over the wing. Such a passage may be a ramp that allows the passengers to safely move from the wing section onto the downwardly angled portion of the evacuation slide. Such ramps are typically inflatable ramps with a horizontal orientation that is used to connect the angled portion of the slide to the aircraft's wing. Ramps are often a separate component that is attached to the evacuation slide.

Inflatable ramps present a number of design challenges because the bottom surface of the ramp must interface with the curved and angled top surface of the wing. The inflatable ramps must safely and reliably support the weight of exiting passengers. The design of aircraft wings provides the upper wing surface with a substantial pitch. This means that the inflatable ramps are desirably adjusted to accommodate height and pitch differences. The general goal of the inflatable ramps is to prevent injury from passengers transitioning from the wing surface to the evacuation slide. It is also necessary that the inflatable ramps meet inflation speed requirements that are set for evacuation slides.

Current inflatable ramps use a single air chamber with an internal system of webs. The webs are formed of webbings and multiple layers of fabric located inside the single air chamber. The layers of fabric are intended to allow the inflatable ramp to conform to the upper surface of the wing and to present a level surface for evacuating passengers. However, these inflatable ramps are heavy and bulky. The trend in aviation design is to lower weight and bulk, and it is thus desirable to modify current inflatable ramps in order to reduce their weight and pack volume.

BRIEF SUMMARY

Embodiments of the present disclosure relate generally to slide ramps designed for use with an aircraft exit door positioned near or over a wing of the aircraft. The embodiments provide a plurality of tubular structures comprising differing diameters and tapering lengths. The tubular structures form a ramp that leads aircraft evacuees from the wing to the evacuation slide. The resulting ramp helps provide a level and even exit surface along a sloped/angled wing, and with respect to the angled wing/fuselage connection.

There is provided a ramp system for an off wing evacuation slide, comprising: a ramp comprising a plurality of tubular structures, at least one tubular structure in the plurality of tubular structures comprising a diameter that differs from an adjacent tubular structure; and at least one tubular structure in the plurality of tubular structures comprising a tapering length, and a floor material disposed over the plurality of tubular structures to create an evacuation surface.

In one example, at least one tubular structure in the plurality of tubular structures comprises a length that differs from an adjacent tubular structure. The plurality of tubular structures may be in fluid communication with one another and with an off wing evacuation slide, such that the ramp system is integrated into the off wing evacuation slide. It is also possible to provide a porch in fluid communication with the ramp. In a more specific example, at least one of the tubular structures has a larger diameter along at least one portion of its length that differs from a diameter along a length of an adjacent tubular structure.

Although any number of tubular structures is possible for use and considered within the scope of this disclosure, in one embodiment, the ramp has at least three tubular structures: a first tubular structure secured to the porch and having a first tapered length, a second tubular structure secured to the first tubular structure and having a second tapered length, and a third tubular structure secured to the second tubular structure and having a third tapered length, wherein the first, second and third tapered lengths are defined by differing diameters along the first, second, and third tubular structures. A further ramp example includes at least three tubular structures, a first tubular structure secured to the porch and having a first diameter smaller than a second diameter, a second tubular structure secured to the first tubular structure and having a third diameter smaller than a fourth diameter, and a third tubular structure secured to the second tubular structure and having a fifth diameter smaller than a sixth diameter, wherein a larger diameter of each tubular structure faces an inboard side of the aircraft fuselage.

BRIEF DESCRIPTION OF THE DRAWINGS

FIGS. 4A-4C illustrate a deployment sequence of a ramp and evacuation slide.

DETAILED DESCRIPTION

Figure 1:
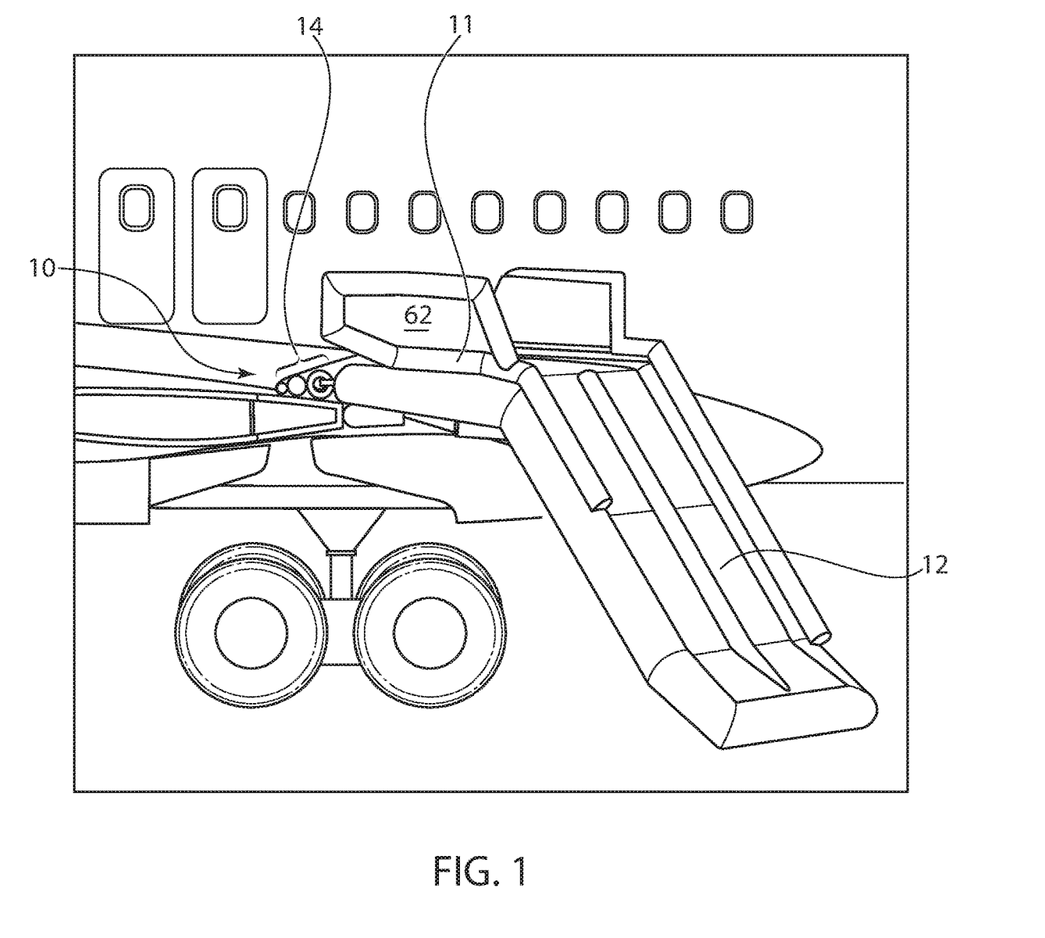
FIG. 1 shows a side perspective view of an aircraft wing with a deployed evacuation slide having ramp disclosed herein.

In order to evacuate an aircraft using an emergency exit door positioned over an aircraft wing, it is necessary to provide a ramp and porch system for transitioning passengers to the evacuation slide. This is because the evacuation slide cannot deploy directly out of the emergency exit door due to the position of the wing and due to the complex shape of the wing. Accordingly, the off wing evacuation slides described herein incorporate a ramp and a porch. One example is illustrated by FIG. 1.

Figure 2A:
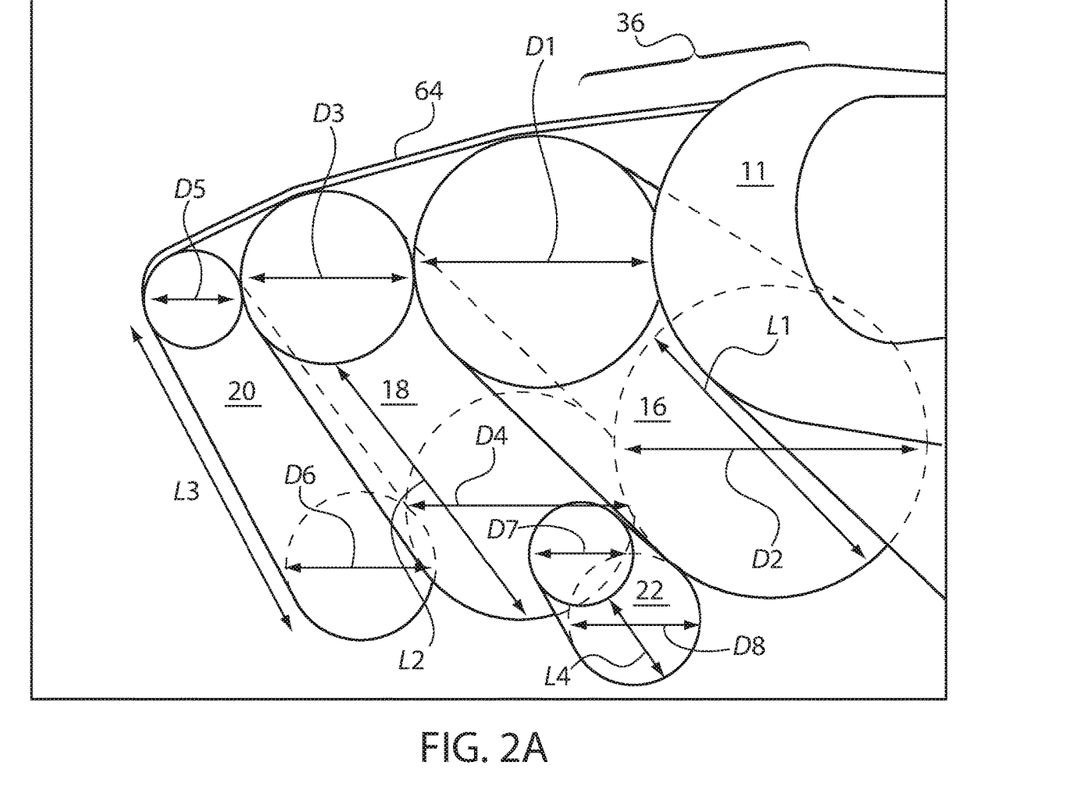
FIG. 2A shows a side perspective view of a first side of a ramp described herein. This view is of a ramp designed for an aircraft wing positioned on the left hand side of the fuselage.
Figure 2B:
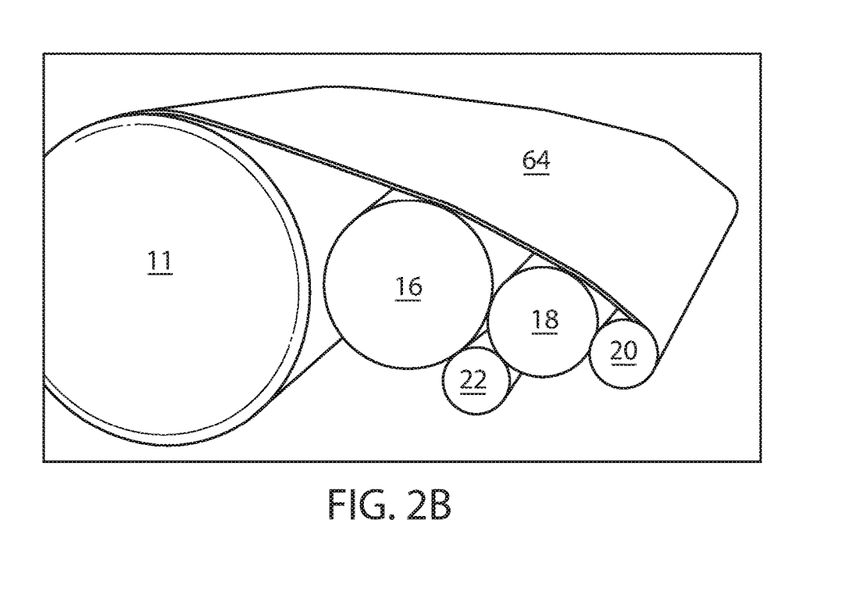
FIG. 2B shows a side perspective of the opposite side of the ramp of FIG. 2A. This view is of a ramp designed for an aircraft wing positioned on the right hand side of the fuselage.

Embodiments of the present disclosure thus provide a ramp 10 for an off wing evacuation slide 12. Rather than being designed as a single mattress with internal webbing, the ramp is made of a plurality 14 of tubular structures. Each tubular structure has a length L and a diameter D, as illustrated by FIGS. 2A and 2B. The tubular structures collectively extend from a porch 11, which connects to the evacuation slide 12. These elements collectively form a platform that provides a more even surface for transitioning evacuees from the wing to the evacuation slide for the purposes of evacuation.

In one specific embodiment, the tubular structures have differing diameters, as illustrated by FIG. 2A. For example, a first tapered tubular structure 16 has a diameter D1 at a first end and D2 at a second end. The diameter D1 is smaller than D2, creating a taper. D1 and D2 are also shown as being larger than the diameters of the other tubular structures shown. The first tubular structure 16 is secured to and in fluid communication with the evacuation slide porch 11. A second tapered tubular structure 18 has a diameter D3 at a first end and D4 at a second end. The diameter of D3 is smaller than D4, creating a taper. In a specific example, D3 is smaller than D1 and D4 is smaller than D2. The second tubular structure 18 is secured to and in fluid communication with the first tubular structure 16. A third tapered tubular structure 20 has a diameter D5 at a first end and D6 at a second end. Diameter D5 is smaller than diameter D6, creating a taper. In a specific example, D5 is smaller than D3 and D6 is smaller than D4. The third tubular structure 20 is secured to and in fluid communication with the second tubular structure 18. FIGS. 2A and 2B also illustrate a fourth tapered tubular structure 22. The fourth tubular structure 22 has a length L4 that is shorter than the lengths L1, L2, and L3 of the first three tubular structures 16, 18, 20. Providing a shorter length L4 assists in leveling the ramp. The shorter tubular structure 22 does not need to extend the full width of the ramp due to the aircraft wing dihedral. The shorter tubular structure 22 may have a tapered length, as illustrated by FIG. 2A. It may have a diameter D7 at a first end and a second diameter D8 at a second end. Diameter D7 may be smaller than diameter D8, creating a taper. It is also possible to provide a non-tapered tubular structure 22. It is further possible to provide one or more of the other tubular structures 16, 18 or 20 as non-tapered.

In one specific example, the tubular structures may have the following diameter ranges.

| Tubular structure | Inboard Diameter | Outboard Diameter |
| --- | --- | --- |
| 16 | D2: 15-10" | D1: 12-8" |
| 18 | D4: 12-6" | D3: 8-6" |
| 20 | D6: 7-4" | D5: 6-2" |
| 22 | D8: 7-4" | D7: 6-3" |

For example, in one ramp designed for a specific aircraft, the tubular structures have the following diameters.

| Tubular structure | Inboard Diameter (closest to fuselage) | Outboard Diameter |
| --- | --- | --- |
| 16 | D2: 12" | D1: 10" |
| 18 | D4: 8" | D3: 7" |
| 20 | D6: 5" | D5: 4" |
| 22 | D8: 5" | D7: 4" |

It should be understood, however, that these examples are provided for illustration and perspective only; they are not intended to be limiting in any way. The precise diameters used on any particular ramp will depend upon different aircraft dimensions, including different wing and fuselage angles.

Providing varying diameters (and optionally, varying lengths of the plurality 14 of tubular structures) and varying tapers allows the ramp 10 to accommodate the sloping direction of an aircraft wing 24. Aircraft wings are designed with an aerodynamic slope 26. This is collectively illustrated by FIGS. 3 and 4. As illustrated by FIGS. 4A-4C, the aircraft wing 24 has an apex 28 near the emergency exit hatch 32. The wing 24 then slopes downwardly to its tip 30 and slopes downward toward the fuselage in a dihedral. These downward slopes 26 would be difficult for passengers to navigate and present a slipping hazard. The plurality 14 of tubular structures of the ramp 10 are thus designed to accommodate these slopes 26 in order to create a generally level exit surface.

Figure 3:
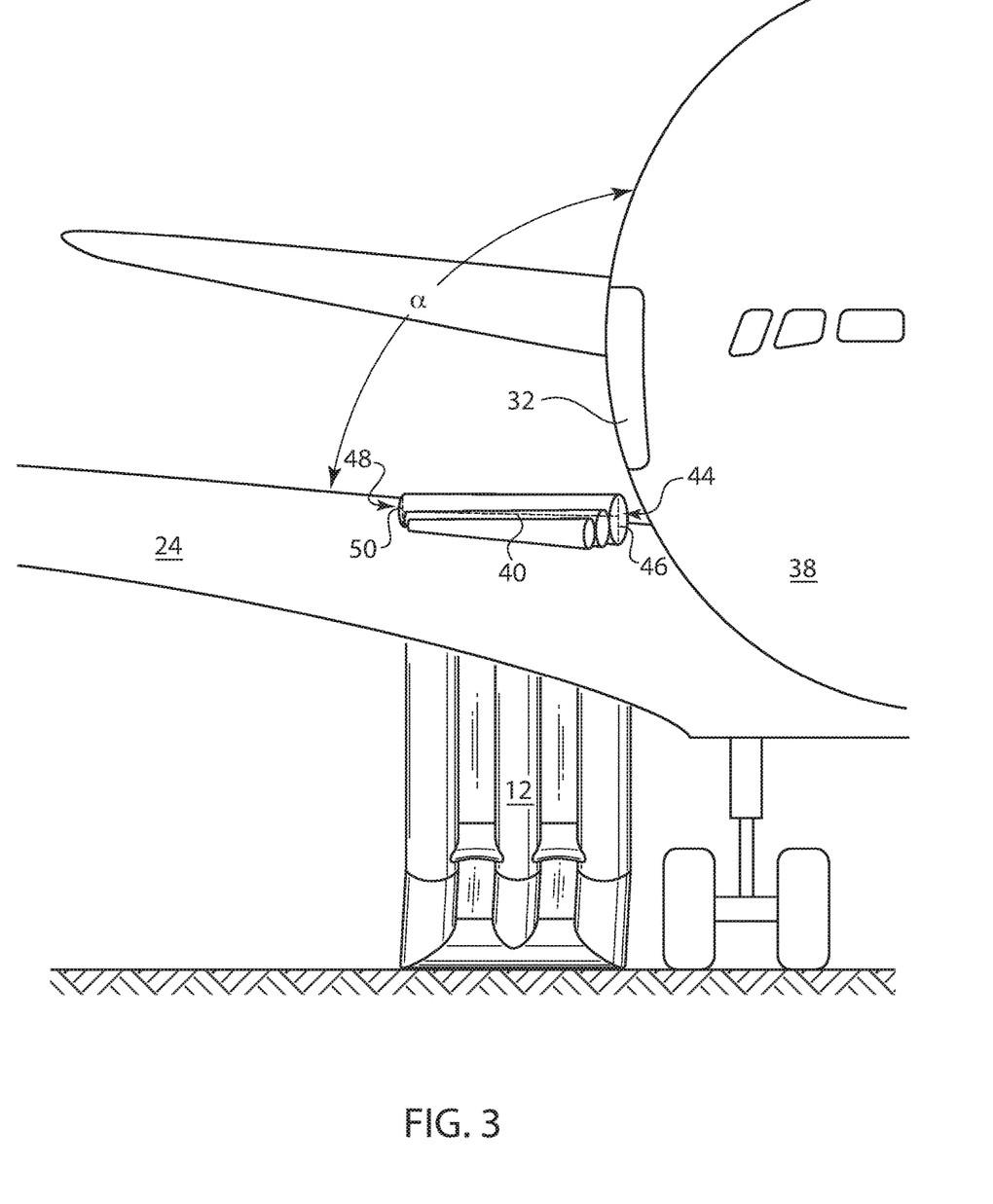
FIG. 3 shows a front plan view of an aircraft wing/fuselage connection, having a ramp disposed therebetween.
Figure 4A:
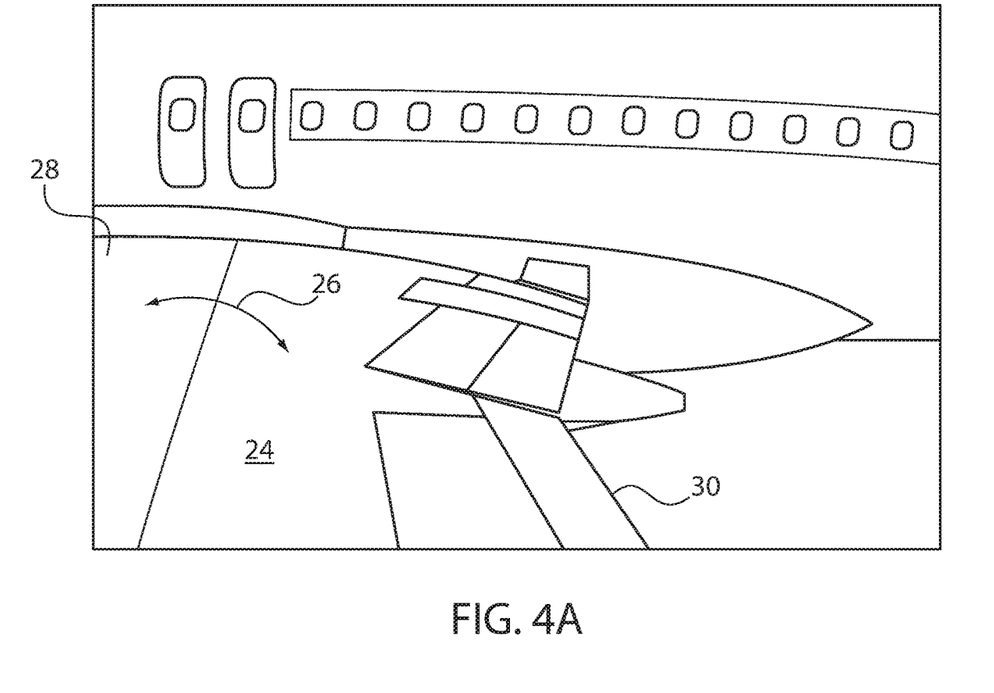
FIG. 4A shows an aircraft wing, prior to slide deployment.
Figure 4B:
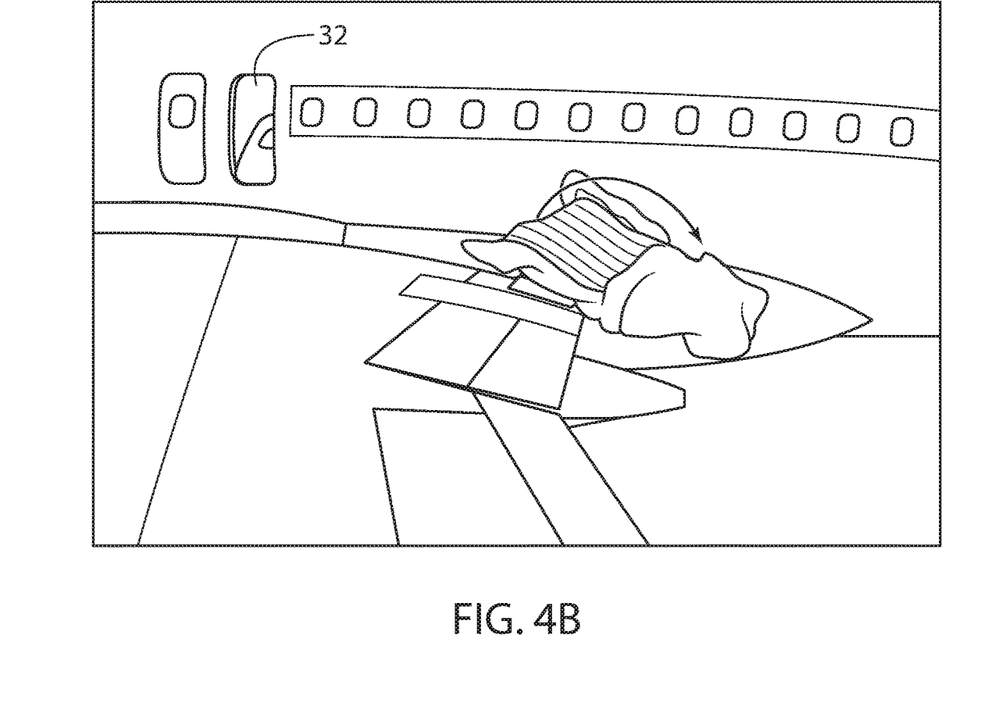
FIG. 4B shows the aircraft wing of FIG. 4A, during the beginning of slide deployment.
Figure 4C:
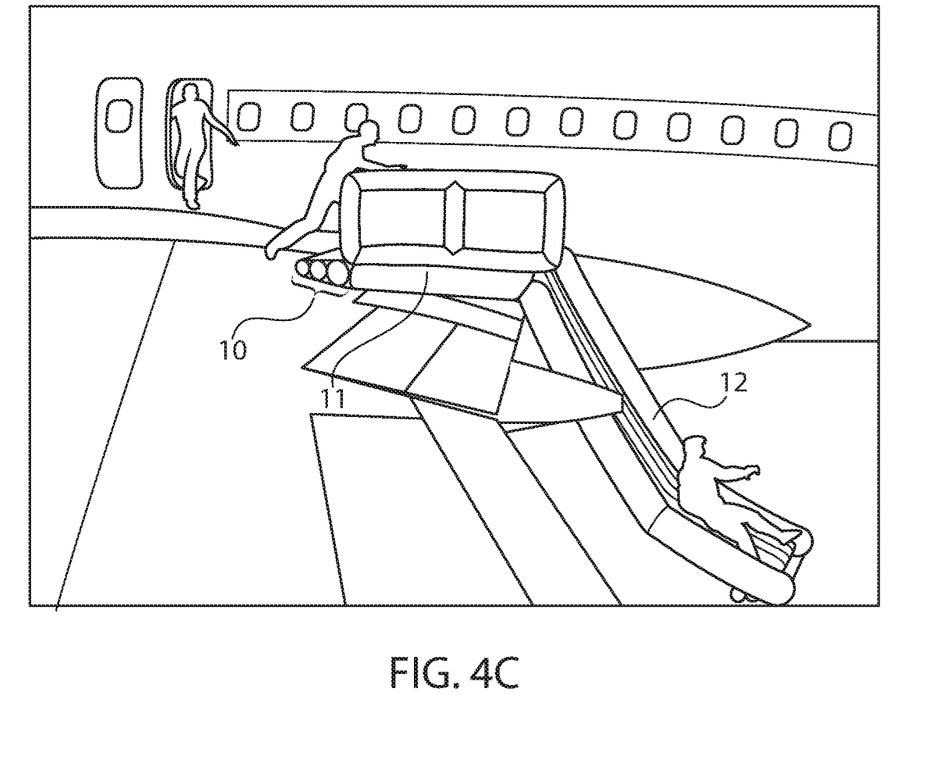
FIG. 4C shows the aircraft wing of FIG. 4B, with the ramp and slide fully deployed.

In the ramp 10 illustrated by FIGS. 1-3, the tubular structure 16 with the largest diameter is positioned directly adjacent to the porch 11. This ramp/porch connection 36 is located between the wing apex 28 and the wing tip 30, where the highest rise of the ramp 10 is desirable (due to the downward slope of the wing and interface to the larger porch tube at this location). This tubular structure 16 may also have a tapered length 40.

For example, as illustrated by FIG. 3, in addition to the downward slope 26 of the wing 24, the wing 24 also does not meet the fuselage 38 at a right angle. Instead, the wing 24 meets the fuselage 38 at an acute angle α. Providing a tapered length 40 along at least some of the plurality of tubular structures allows the ramp to provide a more level exit surface. The tapered length 40 may include a first end 44 of a tubular structure that has a first diameter 46, closest to the fuselage (which may be referred to as an inboard diameter in the above chart). The second end 48 has a second diameter 50, further from the fuselage (which may be referred to as an outboard diameter in the above chart). The first diameter 46 is illustrated as being larger than the second diameter 50, due to the slope of the wing toward the fuselage, and the sides of the tubular structure being tapered accordingly. A floor material 64 is positioned over the plurality of tubular structures. This is illustrated by FIGS. 2A and 2B. The floor material 64 may be any appropriate floor material used in conjunction with evacuation slide ramps (including current materials or future materials to be developed). The primary requirement is that the floor material meet federal regulations governing the aircraft industry. For example, the floor material should be conductive, should have an appropriate coefficient of friction, and should have a high puncture resistance.

Similarly, the material of the tubular structures may be any appropriate tubular structure material used in conjunction with evacuation slides (including current materials or future materials to be developed). The primary requirement is that the materials meet the requirements of federal regulations. As background, current evacuation slide, life raft, and life vest fabrics must meet FAA requirements listed under the appropriate Technical Standard Order (TSO). The TSO prescribes the Minimum Performance Standards (MPS) that these emergency evacuation products must meet. Current inflatable fabrics must also meet a minimum tensile strength of 190 lbs/inch (for slides and life rafts) and 210 lbs/inch (for life vests). Typically, many pieces of fabric (panels) are joined together to form tubular structures, and strength requirements are not only limited to the body fabric, but are also required on seam areas. Safety product inflatables also need to comply with a high pressure test (also called overpressure test) requirement, in which the device must withstand high inflation pressures without causing any damage to the integrity of the seams. For example, slides are required to withstand two times the maximum operating pressure without failure for at least one minute. Depending upon the tube diameter and maximum operating pressure established for a particular evacuation slide, the hoop stress/load/force (which is the larger of the two stresses experienced by the seams) can vary. Evacuation slides must also meet a radiant heat requirement that the tubular structure hold pressure in flammable conditions for at least 180 seconds.

Non-limiting examples of fibers that may be used to form the fabric of the evacuation slide tubular structures include but are not limited to polyamide (nylon), polyethylene terephthalate (PET), polyester, ultra high molecular weight polyethylene (Dyneema® or Spectra®), polypropylene, cotton, carbon, glass meta-aramid material like Nomex™, para aramid material like Kevlar®, liquid crystalline polymers (such as Vectran™), and combinations thereof. The fibers may be any woven, nonwoven, knitted, or film-based substrate, any combinations thereof, or any other appropriate materials. Coatings may be provided on the tubular structures as well. Exemplary coating materials include but are not limited to: polyurethane, vinyl, polyethylene, polypropylene, polyamides, polyethylene terephthalate (PET), polystyrene, ethylene vinyl acetate (EVOH), polyvinylidene chloride (PVDC), polyvinyl alcohol (PVOH), polycarbonate (PC), polyvinyl chloride (PVC), polylactic acid (PLA), or any other appropriate polymer, or combinations thereof.

Figure 6A:
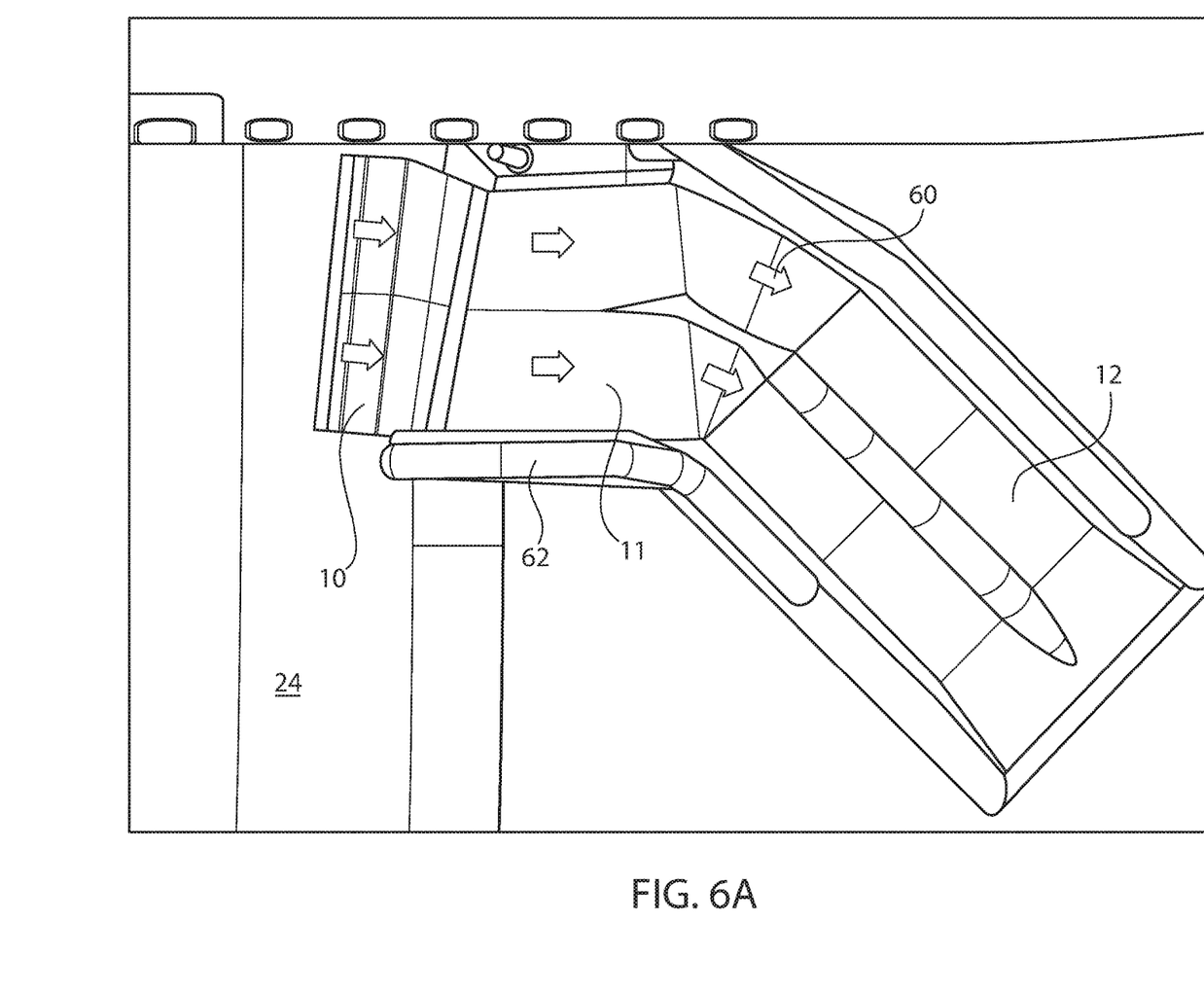
FIG. 6A illustrates a top plan view of FIG. 4C, with the ramp, porch, and evacuation slide deployed, looking forward to aft on an aircraft wing.
Figure 6B:
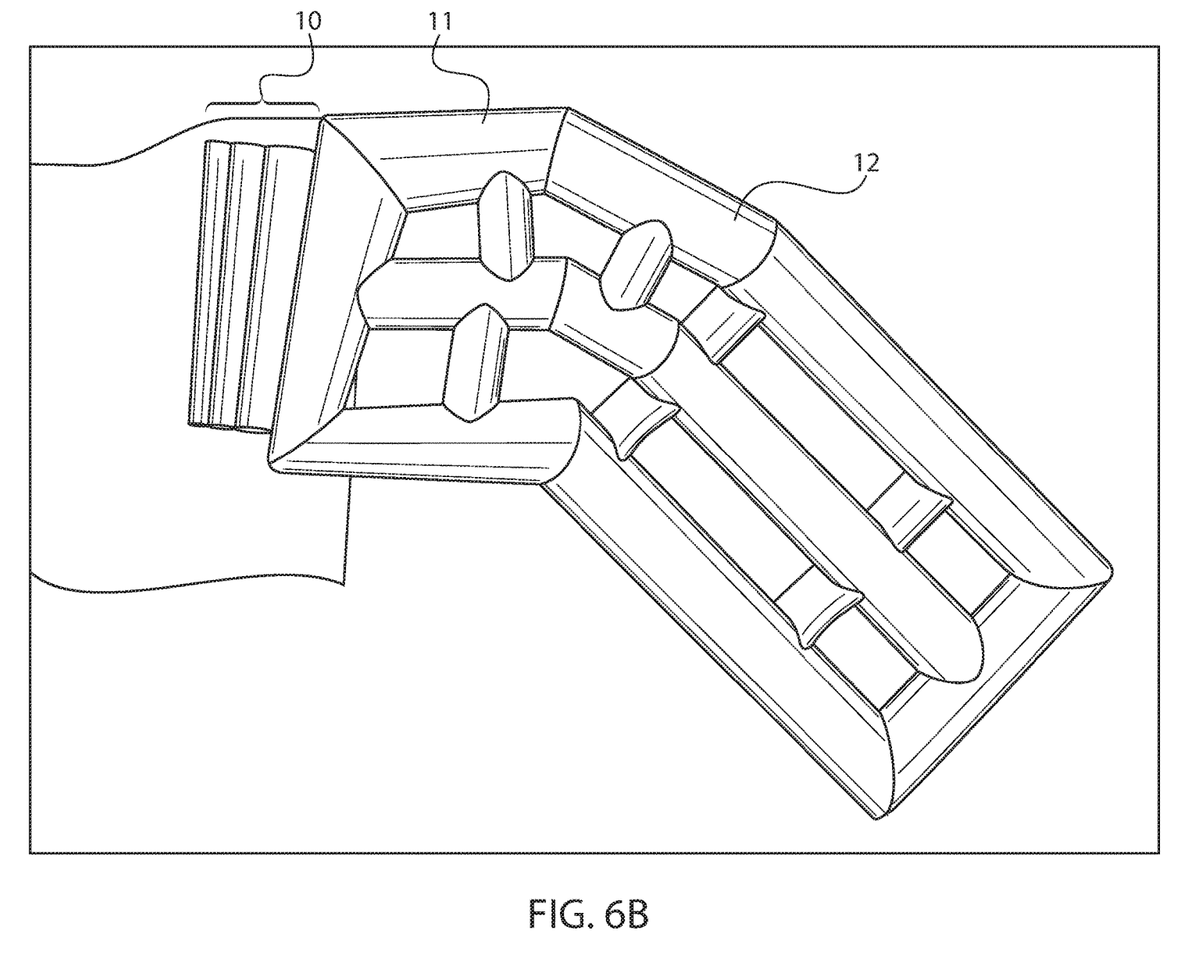
FIG. 6B illustrates the ramp, porch, and evacuation slide of FIG. 6A with the floor material removed in order to show the tubular structures of the ramp, porch, and the evacuation slide.
Figure 7:
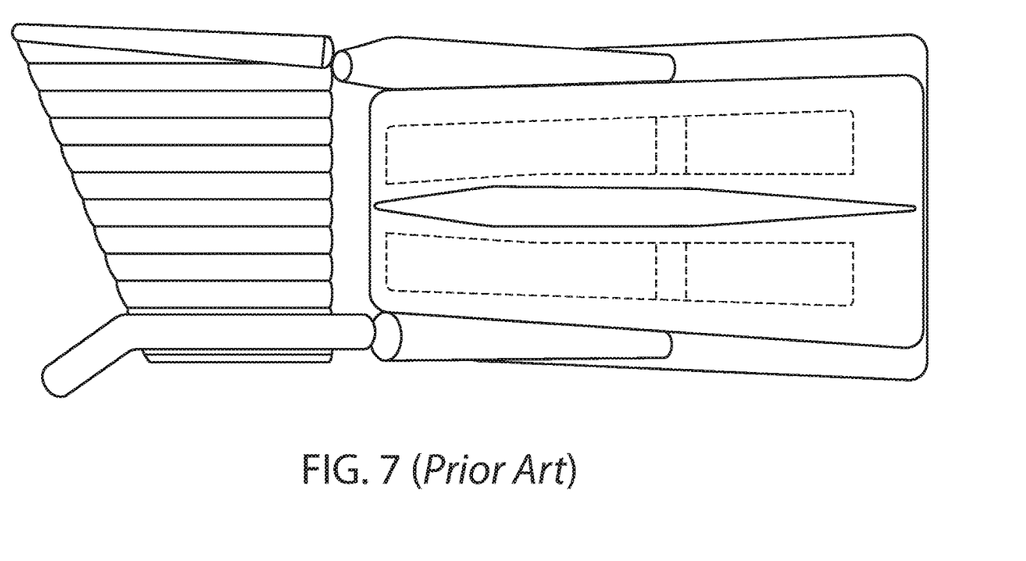
FIG. 7 shows a top plan view of a ramp and evacuation slide prior art.

FIG. 6A illustrates a fully-inflated ramp 10, porch 11 and evacuation slide 12 with the floor material in place. Arrows 60 may be provided on the floor material in order to help guide passengers to the evacuation surface. FIG. 6B illustrates a similar structure with the floor material removed for illustration purposes only.

Figure 5:
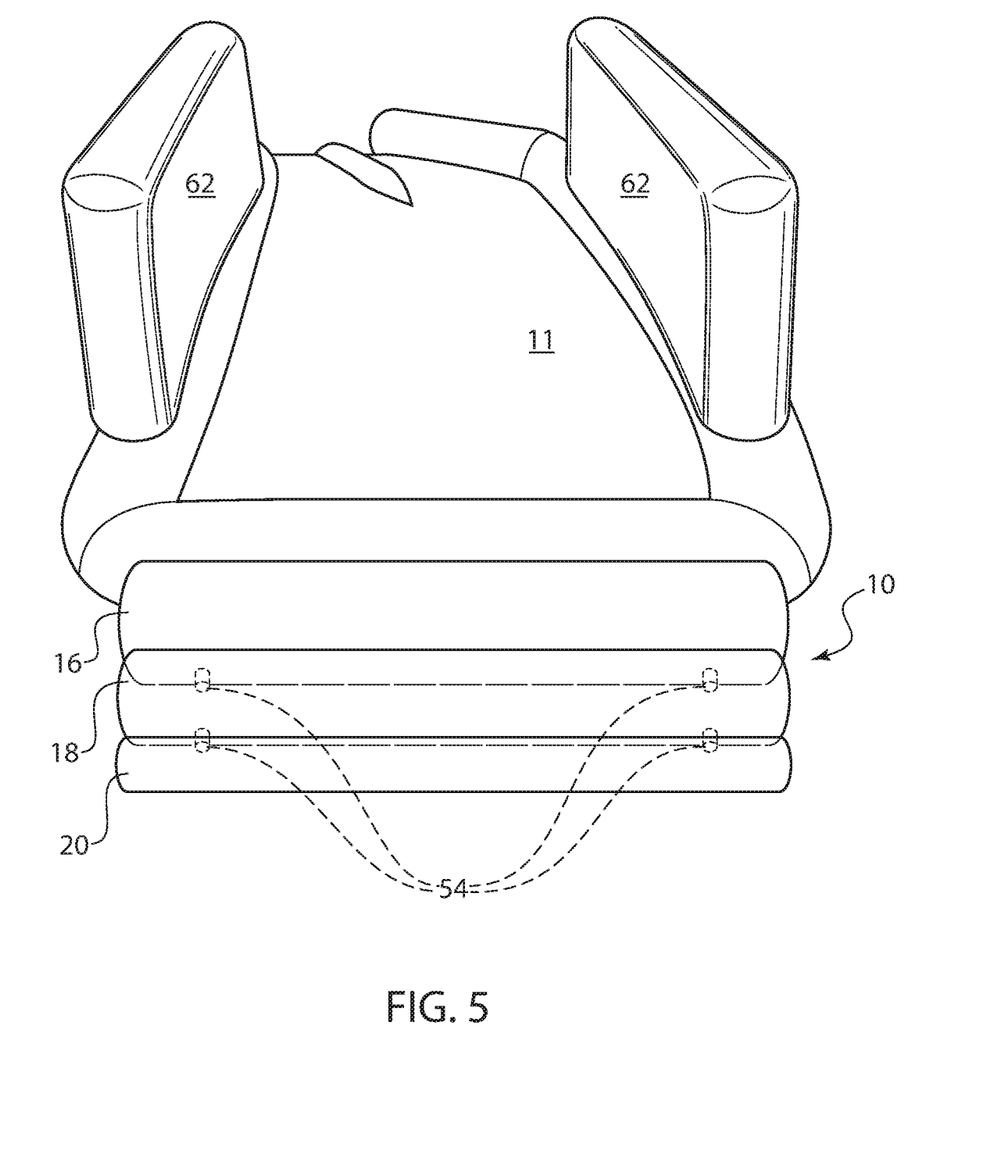
FIG. 5 shows a perspective view of a ramp and a porch that has side rails from the perspective of an evacuee.

FIG. 5 illustrates that the porch 11 may also have inflatable side rails 62. Inflatable side rails 62 help guide evacuees to the evacuation slide. Inflatable side rails 62 may provide a handrail-like surface for balance. Inflatable side rails 62 fluidly communicate with the porch 11. The tubular structures 16, 18, 20 are also fluidly connected to one another and to the porch 11 via communication patches 54. Communication patches 54 provide an area where inflation air may travel to each tubular structure. Upon deployment, the tubular structures of the ramp 10 deploy along with the porch 11 and evacuation slide 12. The ramp 10, porch 11, and evacuation slide 12 collectively form a single inflation unit. Air from the inflation system is allowed to travel through each of the tubular structures via the communication patches 54, such that only a single inflation system is required. (Various evacuation slide inflation systems are possible and considered within the scope of this disclosure.)

Changes and modifications, additions and deletions may be made to the structures and methods recited above and shown in the drawings without departing from the scope or spirit of the disclosure or the following claims.

What is claimed is:

1. A ramp system for an off wing evacuation slide of an aircraft fuselage, comprising:
    a ramp comprising a plurality of tubular structures, at least one tubular structure in the plurality of tubular structures comprising a diameter that differs from an adjacent tubular structure; and at least one tubular structure in the plurality of tubular structures comprising a tapering length;
    a floor material disposed over the plurality of tubular structures to create an evacuation surface,
    wherein a larger diameter of each tubular structures faces an inboard side of the aircraft fuselage.

2. The system of claim 1, wherein at least one tubular structure in the plurality of tubular structures comprises a length that differs from an adjacent tubular structure.

3. The system of claim 1, wherein the plurality of tubular structures are in fluid communication with one another and with an off wing evacuation slide, such that the ramp system is integrated into the off wing evacuation slide.

4. The system of claim 1, further comprising directional arrows on the floor material.

5. The system of claim 1, further comprising an inflation system.

6. The system of claim 1, further comprising a porch in fluid communication with the ramp.

7. A ramp system for an off wing evacuation slide, comprising:
    a ramp comprising a plurality of tubular structures, at least one tubular structure in the plurality of tubular structures comprising a diameter that differs from an adjacent tubular structure; and at least one tubular structure in the plurality of tubular structures comprising a tapering length;
    a floor material disposed over the plurality of tubular structures to create an evacuation surface;
    a porch in fluid communication with the ramp,
    wherein the ramp comprises at least three tubular structures, a first tubular structure secured to the porch and having a first tapered length, a second tubular structure secured to the first tubular structure and having a second tapered length, and a third tubular structure secured to the second tubular structure and having a third tapered length, wherein the first, second and third tapered lengths are defined by differing diameters along the first, second, and third tubular structures.

8. A ramp system for an off wing evacuation slide, comprising:
a ramp comprising a plurality of tubular structures, at least one tubular structure in the plurality of tubular structures comprising a diameter that differs from an adjacent tubular structure; and at least one tubular structure in the plurality of tubular structures comprising a tapering length;
a floor material disposed over the plurality of tubular structures to create an evacuation surface;
a porch in fluid communication with the ramp,
wherein the ramp comprises at least three tubular structures, a first tubular structure secured to the porch and having a first diameter smaller than a second diameter, a second tubular structure secured to the first tubular structure and having a third diameter smaller than a fourth diameter, and a third tubular structure secured to the second tubular structure and having a fifth diameter smaller than a sixth diameter, wherein a larger diameter of each tubular structure faces an inboard side of the aircraft fuselage.

9. A ramp system for an off wing evacuation slide of an aircraft fuselage, comprising:
a ramp comprising a plurality of tubular structures, at least one tubular structure in the plurality of tubular structures comprising a larger diameter along at least one portion of its length that differs from a diameter along a length of an adjacent tubular structure; and at least one tubular structure in the plurality of tubular structures comprising a tapering length;
a floor material disposed over the plurality of tubular structures to create an evacuation surface;
wherein the at least one tubular structure with the larger diameter is in fluid communication with a porch, and wherein the porch is in fluid communication with an evacuation slide,
wherein a larger diameter of each tubular structures faces an inboard side of the aircraft fuselage.

10. A ramp system for an off wing evacuation slide, comprising:
a ramp comprising a plurality of tubular structures, at least one tubular structure in the plurality of tubular structures comprising a larger diameter along at least one portion of its length that differs from a diameter along a length of an adjacent tubular structure; and at least one tubular structure in the plurality of tubular structures comprising a tapering length;
a floor material disposed over the plurality of tubular structures to create an evacuation surface;
wherein the at least one tubular structure with the larger diameter is in fluid communication with a porch, and wherein the porch is in fluid communication with an evacuation slide,
wherein the ramp comprises at least three tubular structures, the at least one tubular structure with the larger diameter and in fluid communication with the porch having a first tapered length, a second tubular structure secured to the first tubular structure and having a second tapered length, and a third tubular structure secured to the second tubular structure and having a third tapered length, wherein the first, second and third tapered lengths are defined by differing diameters along the first, second, and third tubular structures.

11. A ramp system for an off wing evacuation slide, comprising:
a ramp comprising a plurality of tubular structures, at least one tubular structure in the plurality of tubular structures comprising a larger diameter along at least one portion of its length that differs from a diameter along a length of an adjacent tubular structure; and at least one tubular structure in the plurality of tubular structures comprising a tapering length;
a floor material disposed over the plurality of tubular structures to create an evacuation surface;
wherein the at least one tubular structure with the larger diameter is in fluid communication with a porch, and wherein the porch is in fluid communication with an evacuation slide,
wherein the ramp comprises at least three tubular structures, a firs tubular structure secured to the porch and having a first diameter smaller than a second diameter, a second tubular structure secured to the first tubular structure and having a third diameter smaller than a fourth diameter, and a third tubular structure secured to the second tubular structure and having a fifth diameter smaller than a sixth diameter, wherein a larger diameter of each tubular structures faces an inboard side of the aircraft fuselage.

* * * * *